S. G. LANGLEY.
MEANS FOR CHARGING STORAGE BATTERIES.
APPLICATION FILED JUNE 18, 1912.
1,215,309.
Patented Feb. 6, 1917.
2 SHEETS—SHEET 1.
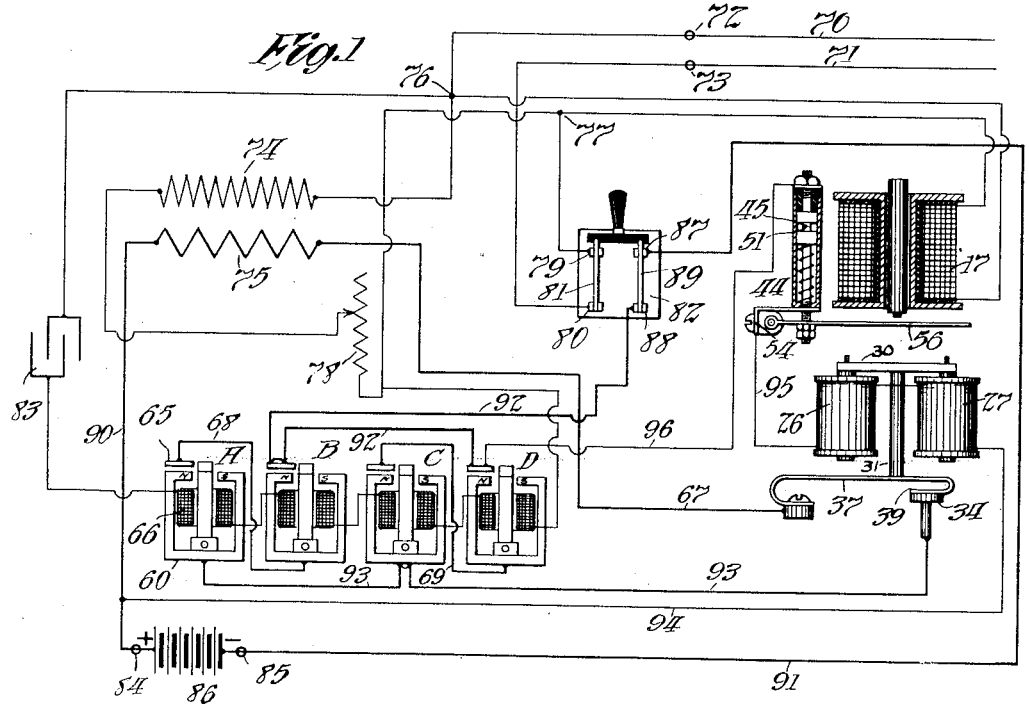
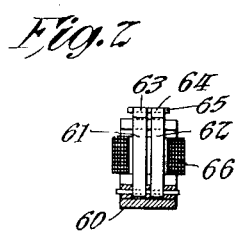
Witnesses:
Inventor:
Sam G. Langley
By Frank L. Dyer
his Atty.

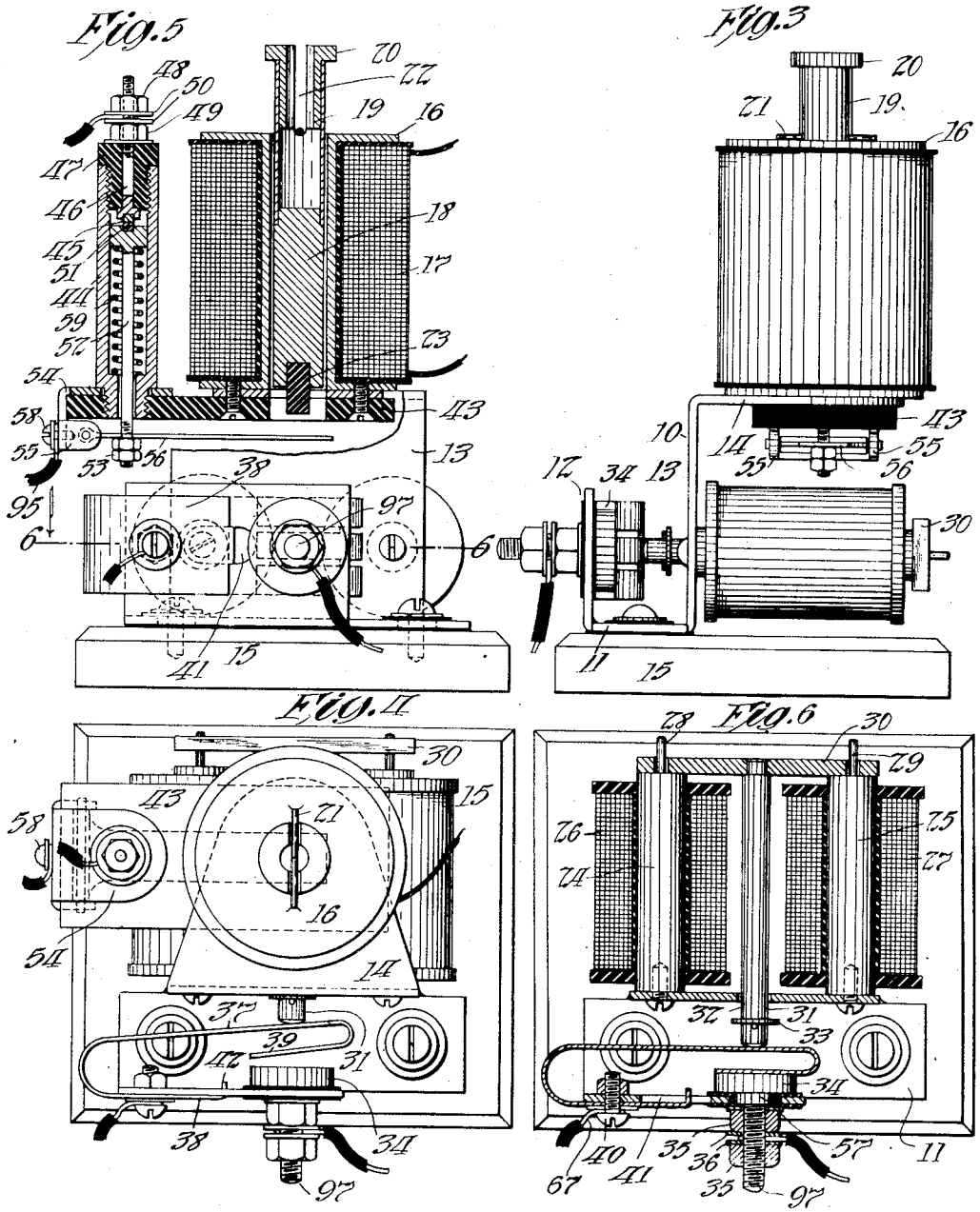

UNITED STATES PATENT OFFICE.

SAM G. LANGLEY, OF WEST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

MEANS FOR CHARGING STORAGE BATTERIES.

1,215,309.      Specification of Letters Patent.     Patented Feb. 6, 1917.

Application filed June 18, 1912. Serial No. 704,338.

*To all whom it may concern:*

Be it known that I, SAM G. LANGLEY, a citizen of the United States, and a resident of West Orange, in the county of Essex and State of New Jersey, have invented certain new and useful Improvements in Means for Charging Storage Batteries, of which the following is a description.

My invention relates generally to means for charging storage batteries, and particularly to apparatus and a system for charging such batteries in which one or more rectifying devices are employed to convert alternating current into uni-directional current which is supplied to the battery to charge the same. In a system of this character it is desirable to provide means for preventing discharge of the storage battery through the rectifying devices or other parts of the system in case of failure of current supply from the source or in case of abnormal decrease in voltage of the same. One of the objects of my invention is the provision of an automatic switch constituting simple and efficient means for this purpose. Another object of my invention is the provision of apparatus constituting a complete charging set capable of being compactly assembled and mounted, and adapted to be connected to a suitable source of alternating current and to a storage battery for charging the same. My invention includes also the combinations of elements and details of construction more fully described hereinafter and claimed.

My copending applications Serial No. 136,781, filed December 13, 1916, and Serial No. 136,782, filed December 13, 1916, are divisions hereof and contain claims covering the automatic switch device.

For the further description of my invention, reference is had to the drawings accompanying and forming part of this specification, and in which—

Figure 1 is a partly diagrammatic view of a charging system including a complete charging set embodying my invention connected to a source of alternating current and to a storage battery;

Fig. 2 is a vertical section of a simplified form of a rectifying device which I prefer to employ in my improved system;

Fig. 3 is a side elevation of my improved automatic switch, with the contacts closed;

Fig. 4 is a plan view of the same, with the contacts open;

Fig. 5 is a vertical view at right angles to the view of Fig. 3, the upper portion being sectional and the lower portion in elevation; and Fig. 6 is a horizontal section on the line 6—6 of Fig. 5.

My improved automatic switch is illustrated in Figs. 3 to 6 inclusive. Referring particularly to these figures, at 10 is shown a supporting member which may be made of a single piece of sheet metal and which has a horizontal portion 11, portions 12 and 13 extending vertically upward, and a horizontal portion 14 extending outwardly from the upper end of the vertical portion 13. The supporting member 10 supports the parts of my improved automatic switch and may be secured to any suitable base member 15. If the base member 15 is of conducting material, the supporting member 10 is preferably insulated therefrom, but if the base member 15 is of insulating material, further insulating means are not necessary in securing the supporting member 10 to the base member 15. On the horizontal portion 14 of the supporting member 10 a solenoid is mounted, which includes a vertically disposed hollow spool 16 which may be made of metal and is preferably non-magnetic, and which is secured to the portion 14 in any suitable manner, as for example, by soldering. The spool 16 is provided with a high resistance solenoid winding 17 suitably insulated from the spool. In the hollow core of the spool a plunger is provided, the lower portion 18 of which consists of magnetic material and is preferably of soft iron, and the upper portion 19 of which consists of non-magnetic material, such as brass or copper, preferably hollowed out to reduce its weight. The upper non-magnetic portion of the plunger is provided with a shoulder 20 or other suitable means for limiting the downward movement of the plunger, and also with a vertical slot 22 through which passes a pin 21 soldered or secured in any other suitable manner to the top of the spool 16 and serving to limit the upward movement of the plunger. In the operation of the device, the pin 21 permits the plunger to rise to a position which is substantially its position of equilibrium for the normal strength of current carried by the coil 17. By having the lower portion of the plunger of soft iron and the upper portion of hollow non-magnetic material, the entire plunger is elevated to the desired position in the solenoid without necessitating the use of such an amount of iron as would render the plunger unduly heavy, and greater sensitiveness of operation is thereby attained. The lower end of the plunger is provided with a piece of insulating material 23 secured thereto to prevent the plunger from coming into electrical contact with the metallic member 56 upon which it impinges when it moves into lowered position.

On the upwardly extending vertical portion 13 of the supporting member 10 and beneath the portion 14, horizontal electro-magnets are mounted, the said electro-magnets comprising magnetic cores 24 and 25, one end of each core being secured to the portion 13 in any suitable manner, as for example, by screws, the core 24 having a winding 26 surrounding it and insulated therefrom, and the core 25 having a winding 27 surrounding it and insulated therefrom. The ends of the cores 24 and 25 which are farthest from the portion 13 are provided with projecting pins of non-magnetic material constituting guides for an armature 30 of soft iron which is elongated in form and has openings near its ends to receive the guides 28 and 29. The armature 30 is provided with a member 31 preferably of non-magnetic material secured at right angles thereto and extending horizontally through an opening 32 in the upright portion 13, the said upright portion 13 thereby constituting a guide for the member 31. On the portion of the member 31 which extends through the upright portion 13 a collar 33 or other suitable means is provided for limiting the movement of the armature 30 away from the cores 24 and 25 of the electro-magnets.

On the upwardly extending portion 12 of the supporting member 10 a contact 34 is mounted and suitably insulated therefrom. The contact surface of this contact faces the end of the member 31 which extends through the opening 32 on the upwardly extending vertical portion 13. The contact 34 is preferably a metallic disk or block and is provided with a reduced portion 57 extending through an opening in the upright portion 12, and with a threaded stem 97. The threaded stem is provided with a nut 35 which coöperates with the disk or block 34 and with insulating washers to hold the contact in place on its support, and with washers 36 and a nut 35' which affords means for connecting the terminal 34 in the battery circuit. On the upright portion 12 is also mounted a spring contact 37 which consists of an elongated portion and end portions 39 and 38 bent back approximately parallel to the elongated portion when the contact is in closed position. The portion 38 of the spring contact 37 is secured to the upwardly extending vertical portion 12 by any suitable means, as for example, a bolt and nut 40. At the end of the portion 38 an inturned projection 42 is provided which coöperates with a slot 41 in the upright portion 12 to position the contact against rotary displacement around the bolt 40. The head of the bolt 40 coöperates with a washer to connect the contact in circuit. The end of the portion 39 of the spring contact 37 is split into a plurality of parts which constitute contact faces coöperating with the contact 34, and insure adequate contact therewith. On account of the resiliency of the spring contact 37, the portions 38 and 39 tend to spring out of parallelism with the elongated portion of the spring, whereby the portion 39 is moved away from the contact 34 as is illustrated in Fig. 4. When, however, the windings 26 and 27 are energized, the armature 30 is attracted toward the cores 24 and 25, and the contacts 37 and 34 are forced into closed position by the end of the member 31. It is to be observed that the entire length of the spring contact 37, including the bent back portion 39, is effective in exerting pressure against the actuating member 31, and that, on account of the shape of the spring, this pressure is great when the armature 30 is in contact with or nearest the cores 24 and 25. The bent back portion 39 contributes materially to forcing the armature 30 away from the cores, which effectually overcomes any tendency of the armature to stick to the cores.

A plate of insulating material 43 has one end secured to the under side of the horizontal portion 14 and serves as a support at its other end for a hollow tube 44, which is made of metal, as for example, brass, and which is screw threaded at its lower end into the insulating plate 43. At the upper end of the tube 44 a plug 47 of insulating material is inserted, through which extends a conducting member 46 screw threaded at its upper end and provided with a contact 45 at its lower end. The upper end of the member 46 is provided with nuts 48 and 49 and washers 50 which serve to connect a conductor in circuit, the nut 49 serving also to secure the member 46 in the insulating plug by coöperation with a headed portion at the other end of the said member 46. In the lower portion of the tube 44 and extending through the bottom thereof and through the insulating plate 43 is an elongated member 52 provided at its upper end with a contact 51 and screw threaded at its lower end. A coiled spring 59 encircles the member 52 within the hollow cylinder and is located between a shoulder on the upper portion of the member 52 and a shoulder in the lower portion of the tube 44, thereby tending to elevate the member 52 and to force contact 51 into contact with the contact 45. A bracket 54 is held in place on the insulating plate 43 by the cylinder 44, the lower end of the cylinder being extended through a portion of the bracket lying on the upper surface of the insulating plate 43. The bracket 54 is insulated from the horizontal supporting portion 14 by the insulating plate 43. The bracket 54 is provided with lugs 55, upon which an elongated member 56 of light weight, which may be made of fairly stiff sheet metal, is pivotally supported. The member 56 has an opening through which the lower end of the member 52 passes loosely, and nuts 53 are provided at the lower end of the member 52 and beneath the elongated member 56 in such a manner that the elongated member 56 is supported in an approximately horizontal position and its free end is located immediately beneath the insulating block 23 of the plunger 18. Upon failure of current or abnormal decrease in current strength of the coil 17, the plunger 18 drops by gravity and impinges upon the free end of the pivoted member 56, thereby depressing the member 52 against the action of the spring 59 and separating the contacts 45 and 51. The bracket 54 is provided with a screw and washer 58 for connecting the bracket in circuit. It will be observed that the bracket 54 is in electrical connection with the tube 44 and the contact 51.

In Fig. 1, in which a complete charging set embodying my invention is illustrated, 72 and 73 are terminals adapted to be connected to alternating current mains 70 and 71 respectively which are supplied with alternating current from any suitable source. Terminals 84 and 85 are provided, which are adapted to be connected to a storage battery and are shown connected to the storage battery 86. At 74 and 75 respectively are shown the primary and secondary of a transformer, suitably designed to transform the current from the source 70 and 71 to a voltage suitable for charging the storage battery. The terminal 72 is connected to a junction point 76, to which one terminal of the primary winding 74 is connected. The other terminal of the primary winding is connected to one terminal of an adjustable rheostat 78, the other terminal of the rheostat being connected to a junction point 77. The junction point 77 is connected to a contact 79 of a double pole manually operated switch 82, which is provided with a contact 80 adapted to be connected to the contact 79 by the switch blade 81 and with contacts 87 and 88 adapted to be connected together by the switch blade 89. Switch blades 81 and 89 are provided with a common handle for opening and closing the switch. The switch contact 80 is connected to the terminal 73. When the switch 82 is closed, the primary 74 of the transformer is connected across the alternating current mains 70 and 71 through the switch blade 81 and the adjustable rheostat 78. A suitable rectifying device or devices are provided. I have illustrated four such devices A, B, C and D, which are preferably of the type of rectifying devices described and claimed in my application Serial No. 702,187, filed June 7, 1912. Each of these rectifying devices includes a permanent magnet 60 having an almost closed magnetic circuit. In the gap of the magnetic circuit of the permanent magnet 60 one or more soft iron armatures 61 and 62 are pivotally mounted at their lower ends on the permanent magnet or on a suitable frame which may also be used for supporting the magnet. Armatures 61 and 62 are provided at their upper ends with suitable contacts 63 and 64 respectively which are preferably of carbon. The vibrating contacts 63 and 64 coöperate with the stationary contact 65. Surrounding the armatures 61 and 62 is an actuating coil 66. When the actuating coil is supplied with alternating current an alternating magnetic flux is set up in the soft iron armatures 61 and 62, making of their upper ends alternately north and south poles. When the upper ends of the armatures are north poles, the south pole of the permanent magnet is strengthened and the north pole is weakened, and vice versa. The armatures are therefore vibrated in synchronism with the alternating current in the actuating coil and open and close a circuit containing the stationary contact 65 and the vibrating contacts 63 and 64. The vibrating contacts 63 and 64 are connected together through the armatures and their supporting means, including the permanent magnet or the frame. In the system illustrated, the actuating coils of the devices A, B, C and D are connected in series by a conductor extending from the junction point 76 through a condenser 83 to the junction point 77. The actuating coils are therefore connected in series across the terminals 72 and 73 and across the alternating current mains 70 and 71 when the terminals 72 and 73 are connected to the mains. The condenser 83 is adjusted so as to advance the phase of the current in the actuating coils to a sufficient extent to compensate for the inductance of the coils and for the inertia of the armatures, and to insure the making and breaking of the rectifying circuits at the proper times to reduce or substantially prevent sparking. One terminal of the secondary 75 is connected by conductor 90 to the terminal 84 which is connected to the storage battery 86, and the other terminal of the secondary 75 is connected by a conductor 67 to the spring contact 37 of the automatic switch. The fixed contact 34 of the automatic switch is connected by conductor 93 to the armatures and vibrating contacts of two of the rectifying devices, as for example, the devices A and C. The fixed contacts of the rectifying devices A and C are connected to the vibrating contacts and armatures of devices B and D by conductors 68 and 69 respectively. The fixed contacts of the devices B and D are connected together and to the contact 88 of the manually operated switch 82 by means of conductor 92. The contact 87 of the manually operated switch 82 is connected to the terminal 85 by conductor 91, the terminal 85 being connected to the storage battery 86. The winding 17 of the solenoid is connected between the junction points 76 and 77 and is therefore connected across the terminals 72 and 73 and alternating current mains 70 and 71 connected thereto through switch blade 81 of manually operated switch 82. The electro-magnet windings 26 and 27 are connected in series across the battery terminals and in series with contacts 45 and 51, the circuit being as follows:—from terminal 84 through conductor 94 to magnet winding 27, through magnet winding 26, conductor 95, bracket 54, cylinder 44, contact 51, contact 45, conductor 96, the conductor 96 being in electrical connection with the fixed contacts of rectifying devices B and D, which contacts are in electrical connection with terminal 85 through conductor 92, switch contact 88, switch blade 89, switch contact 87 and conductor 91.

The operation of the system is as follows:—

When the terminals 72 and 73 are connected to mains 70 and 71 supplied with alternating current and the switch 82 is closed, the solenoid winding 17 is energized, the core 18 is elevated into its upper position, and the contacts 45 and 51 are permitted to close. The magnet windings 26 and 27 are then energized from the storage battery, the armature 30 is attracted to the cores 24 and 25, contacts 37 and 34 are closed by the action of the member 31 secured to the armature 30, and the battery is connected in circuit with the rectifying system. The armatures of the rectifying devices are vibrated in synchronism with the alternating current to be rectified, and the contacts of each device are closed during alternate half waves of alternating current and opened during the remaining half waves. The path of the rectified current is as follows:—starting at the left hand end of the secondary 75, through conductor 90, to terminal 84, through storage battery 86 to terminal 85, through conductor 91, switch contact 87, switch blade 89, switch contact 88, conductor 92, to the fixed contacts of rectifying devices B and D. At this point the current divides, one path being through contacts and armatures of rectifying device B, through conductor 68 to contacts and armatures of rectifying device A, and to conductor 93; the other path being through contacts and armatures of rectifying device D, conductor 69, contacts and armatures of rectifying device C, to conductor 93, and uniting with the other branch of the circuit, and thence through conductor 93 to fixed automatic switch contact 34, spring contact 37, conductor 67, and back to the right hand end of the secondary 75 of the transformer. In this manner unidirectional current is supplied to the battery to charge the same, and the strength of the charging current may be regulated by the adjustable rheostat 78 in circuit with the primary 74 of the transformer. While the battery is being charged, the rectifying system coöperates with the battery in supplying current to the magnet windings 26 and 27. If for any cause there is a failure of the current supplied to the alternating current mains, or if the voltage drops abnormally, for example, to such an extent as to reduce the voltage of the charging current below the battery voltage, the plunger of the solenoid will be permitted to drop, impinging upon the member 56, and separating contact 51 from contact 45 against the action of the spring 59, the tension of the spring 59 and weights of the member 56 and the plunger of the solenoid being properly proportioned to produce this result. The separation of contacts 51 and 45 causes the circuit through the magnet windings 26 and 27 to be broken, and the resiliency of the spring contact 37 forces the armature 30 away from its core and separates contact 37 from contact 34, thereby breaking the circuit between the battery and the rectifying devices, and preventing any possible discharge from the battery through the rectifying devices. When current comes on again in the mains 70 and 71 or the voltage rises to the required amount, the solenoid winding 17 is immediately energized, the core 18 elevated out of contact with the member 56, permitting the closing of the contacts 51 and 45, thereby closing the circuit through the magnet windings 26 and 27, which causes the cores 24 and 25 to attract the armature 30 and thereby close contact 37 against contact 34, thus reëstablishing the connection between the rectifying devices and the storage battery. Obviously, opening the hand operated switch 82 deenergizes the solenoid winding 17 and causes the battery circuit to be opened at contacts 37 and 34. Furthermore, when the hand operated switch 82 is opened, there is no sparking at the contacts of the automatic switch because the circuits are broken first at the hand operated switch.

By having the plunger 18 disconnected from the contact which it is to operate, the evil effects of chattering, which are liable to occur in alternating current apparatus, are obviated. That portion of the device including the solenoid winding 17 and the contacts 45 and 51 acts as a relay for the electromagnets 26 and 27 which control contacts 34 and 37 carrying large currents. In my improved apparatus I am enabled to combine sensitiveness and positiveness of action, and no chattering whatever occurs.

Having now described my invention, what I claim as new therein and desire to protect by Letters Patent is as follows:—

1. In a system of the class described, the combination of a storage battery and means for supplying unidirectional current thereto, including a source of alternating current, rectifying means, and means controlled by the voltage of said source for connecting said battery to said rectifying means, substantially as described.

2. In a system of the class described, the combination of a storage battery and means for supplying unidirectional current thereto, including a source of alternating current, rectifying means, and automatic means for maintaining the connection of the battery to the rectifying means while the voltage of the source is in excess of a predetermined value and for breaking the connection when the voltage of the source falls below said value, substantially as described.

3. In a system of the class described, the combination of a storage battery and means for charging the same, including a source of alternating current, rectifying means, a manually operated switch, and an automatic switch governed by the voltage of the source for controlling the connection and disconnection of the battery and rectifying means, said automatic switch being operable to connect the battery and rectifying means only when the manually operated switch is closed, substantially as described.

4. In a system of the class described, the combination of a storage battery and means for charging the same, including a transformer having primary and secondary windings, rectifying means, an automatic switch having a winding supplied with current from the primary and having contacts controlled by said switch winding for making and breaking connection between the battery and the rectifying means, and a manually operated switch for controlling the automatic switch circuit and the battery connection, substantially as described.

5. In a system of the class described, the combination of a storage battery and means for supplying unidirectional current thereto, including a source of current, rectifying means, and means for automatically establishing connection between said storage battery and said rectifying means whenever a predetermined electrical condition exists in said source, substantially as described.

6. In a system of the class described, the combination of a storage battery and means for charging the same, including a source of alternating current, rectifying means, and contacts for making and breaking connection between the battery and the rectifying means, said contacts being automatically moved relatively to each other into circuit making or breaking position according to the electrical condition of said source, substantially as described.

7. In a system of the class described, the combination of a storage battery and means for charging the same, including a source of alternating current, a transformer, rectifying means, a connection between the rectifying means and the battery, a connection between the transformer and the source of current, an automatic switch having a winding supplied with alternating current from the source and having contacts controlled by said winding in the connection between the battery and the rectifying means, and a manually operated switch for simultaneously controlling said connections and the automatic switch winding, substantially as described.

This specification signed and witnessed this 14th day of June 1912.

SAM G. LANGLEY.

Witnesses:
HENRY LANAHAN,
ANNA R. KLEHM.